United States Patent [19]

Butman, Jr. et al.

[11] Patent Number: 4,584,497
[45] Date of Patent: Apr. 22, 1986

[54] BEAM SUPPORT FOR BAR WINDINGS OF LARGE ELECTRIC GENERATOR

[75] Inventors: Thomas R. Butman, Jr., Albany; Nickolas Schmitt, deceased, late of Schenectady, both of N.Y., by Marjorie Schmitt, executrix

[73] Assignee: General Electric Company, Schenectady, N.Y.

[21] Appl. No.: 656,126

[22] Filed: Sep. 28, 1984

[51] Int. Cl.⁴ .............................................. H02K 3/48
[52] U.S. Cl. ..................... 310/214; 310/42; 310/43; 310/254
[58] Field of Search ............ 310/254, 42, 256, 43, 310/213, 45, 214, 91, 215, 260, 165, 201, 180, 179, 184, 198; 322/21, 58, 59, 60

[56] References Cited

U.S. PATENT DOCUMENTS

| | | | |
|---|---|---|---|
| 3,243,622 | 3/1966 | Whittlesey | 310/214 |
| 3,479,543 | 11/1969 | Drexler | 310/162 |
| 3,780,325 | 12/1973 | Frankenhauser | 310/214 |
| 3,949,255 | 4/1976 | Brown | 310/214 |
| 4,149,101 | 4/1979 | Lesokhin | 310/214 |
| 4,369,389 | 1/1983 | Lambrecht | 310/214 |
| 4,377,764 | 3/1983 | Butman | 310/201 |
| 4,385,252 | 5/1983 | Butman et al. | 310/214 |
| 4,443,725 | 4/1984 | Derderian | 310/214 |

FOREIGN PATENT DOCUMENTS

| | | | |
|---|---|---|---|
| 1095108 | 2/1981 | Canada | 310/214 |
| 2719071 | 2/1978 | Fed. Rep. of Germany | 310/214 |
| 0033307 | 3/1978 | Japan | 310/214 |
| 0142501 | 11/1979 | Japan | 310/214 |

OTHER PUBLICATIONS

GENERREX-PPS (Potential Power Source) Excitation System for Wisconsin Power & Light, Edgewater 5, G. M. Cotzas et al, 43rd Annual American Power Conference, Chicago, Illinois, Apr. 27-29, 1981.

Primary Examiner—R. Skudy
Attorney, Agent, or Firm—Jerome C. Squillaro; Paul Checkovich

[57] ABSTRACT

A stator of a large generator includes three potential, or "P" bars, disposed in slots atop the armature conductors in three of the stator slots. The "P" bars are part of a self-excitation system for producing DC excitation power for the rotating field of the generator. At least the stator slots containing the "P" bars include a pair of dovetail slots spaced radially closer to the air gap than the dovetail slots in the remaining stator slots used for securing armature conductor bars in stator slots. The inner end of a beam is fitted into the dovetail slot over the "P" bar. A yoke is secured over the outer end of the beam. The yoke is secured to studs in space block extensions positioned adjacent the stator slot containing the "P" bar. A ripple spring between the beam and the "P" bar applies a radial force to securely retain the "P" bar and the armature conductor bars in the slot.

17 Claims, 14 Drawing Figures

BEAM SUPPORT FOR BAR WINDINGS OF LARGE ELECTRIC GENERATOR

BACKGROUND OF THE INVENTION

The present invention relates to large dynamoelectric machines and, more particularly, to the stators of the large electric generators which are commonly the armatures of the generators.

As is well known, large electric generators employ a stator built up by stacking thin laminations of magnetic material to form a generally annular assembly. An array of axial slots are formed in the radially inner surface of the annular assembly. Each axial slot contains at least one and preferably two armature bars which form part of the armature winding in which the electric output is induced.

A rotor is arranged to rotate coaxially within the stator. The rotor conventionally contains field windings which are excited by a DC excitation source of relatively low voltage (from about 300 to about 700 volts) in order to produce a magnetic field rotating at the same speed as a rotor. Prior art excitation sources include shaft-mounted DC generators, shaft-mounted AC alternators feeding rectifiers and external sources of excitation power. The excitation power from external sources is fed to the rotating field windings through slip rings. One popular type of external sources makes use of the AC output of the generator itself which, after passing through a transformer to provide the desired excitation voltage, is rectified and fed through slot rings to the field windings.

A more recent excitation system employs potential windings in, for example, three stator slots spaced 120 degrees apart. The three potential windings, which are hereinafter referred to as "P" bars, are exposed to alternations of the magnetic field which induces an AC voltage therein. The three "P" bars, being spaced 120 mechanical degrees apart therefore comprise a three-phase source whose output can be transformed as necessary to establish a desired excitation voltage which may then be rectified and the resulting DC fed through slip rings to the field windings. A self-excited system of this type is described in a paper by Cotzas et al entitled "GENERREX-PPS (Potential Power Source). Excitation System for Wisconsin Power & Light, Edgewater 5", presented at the Forty-Third Annual American Power Conference, Chicago Ill., Apr. 27-29, 1981. The GENERREX-PPS system provides a compact equipment giving reduced space requirements and simplified maintainability of a large generator. Control of the generator field voltage is accomplished by high-speed thyristor action. Further details of the GENERREX system do not concern the present disclosure and are therefore omitted.

The stator armature bars are conventionally clamped in the stator slots using dovetail grooves near the radially inner ends of the slots into which wedges are firmly engaged. The wedges impose radial forces on the armature bars for resisting radial forces on the armature bars due to normal and abnormal magnetic and electrical forces imposed on them.

The "P" bars are conventionally disposed radially inward of the wedges between the wedges and the surface of the rotor and are tied in place using, for example, a fiber roving pre-impregnated with a heat-curable resin which is cured after the roving is installed. One such method for securing "P" bars in place is disclosed in U.S. Pat. No. 4,385,252.

Securing the "P" bars atop the wedges imposes certain penalties. The need to manually wrap ties every few inches about the "P" bars and the wedge and to then cure the resin in the ties adds substantially to the labor required for assembly of the generator. In addition, after a generator has been in service for a substantial period, the stator may require refurbishing. Since the three "P" bars are atop the wedges, replacement of the wedges in the three slots contain the "P" bars requires cutting the roving ties and removing the "P" bars before removing and replacing the wedges. In order to remove the "P" bars, their coolant piping and end turns must be disconnected. Since the "P" bars are on the order of an inch or two in cross section and as much as 25 or more feet long, the chance of damaging them during removal is quite high. After new wedges are in place, the "P" bars must again be installed, tied in place and cured. These penalties all equate to adverse labor cost and/or schedule impact.

One technique for securing "P" bars in stator slots is disclosed in U.S. patent application Serial No. 656,107 filed on the same date as the present application. In this disclosure, each stator slot includes an inner pair of the dovetail slots and an outer pair of dovetail slots. In all stator slots except those containing "P" bars, the wedges are installed in the inner pair of dovetail slots to secure the armature bars in place. In stator slots containing the "P" bars, the "P" bars are installed on top of the armature bars inside the slots and the wedges are installed atop the "P" bars in the outer pair of dovetail slots.

In order to reduce heating of the ends of the stator core due to stray axial magnetic fields, it is desriable to outwardly taper the last several inches of the stator core. The outward taper intersects the outer pair of dovetail slots thus reducing or eliminating support of the "P" bars and underlying armature bars in the outer several inches of the stator slots containing the "P" bars. The outward taper may not intersect the inner pair of dovetail slots and thus the armature bars contained in the stator slots not containing "P" bars may not be satisfactorily supported to the axial ends of the stator.

OBJECTS AND SUMMARY OF THE INVENTION

It is an object of the invention to provide a technique for securing "P" bars in a generator stator which overcomes the drawbacks of the prior art.

It is a further object of the invention to provide a technique for securing "P" bars in a generator stator which the ends of the stator core are provided with an outward taper.

It is a still further object of the invention to provide supporting bridges to maintain radial force on outer ends of "P" bars and armature bars whose central portions are secured beneath wedges in dovetail slots.

Briefly stated, the present invention provides apparatus for securing three potential, or "P" bars, atop armature bars in a stator of a large generator. At least the stator slots containing the "P" bars include a pair of dovetail slots spaced radially closer to the air gap than the dovetail slots in the remaining stator slots used for securing armature conductor bars in stator slots. An outward taper at the ends of the stator intersects and weakens the axially outer portions of the dovetail slots in the stator slots containing the "P" bars thereby weakening and reducing the effectiveness of the support provided by those dovetail slots. The inner end of a beam is fitted into the dovetail slot over the "P" bar. A yoke is secured over the outer end of the beam. The yoke is secured to studs in space block extensions positioned adjacent the stator slot containing the "P" bar. A ripple spring between the beam and the "P" bar applies a radial force to securely retain the "P" bar and the armature conductor bars in the slot.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENT

Figure 1:
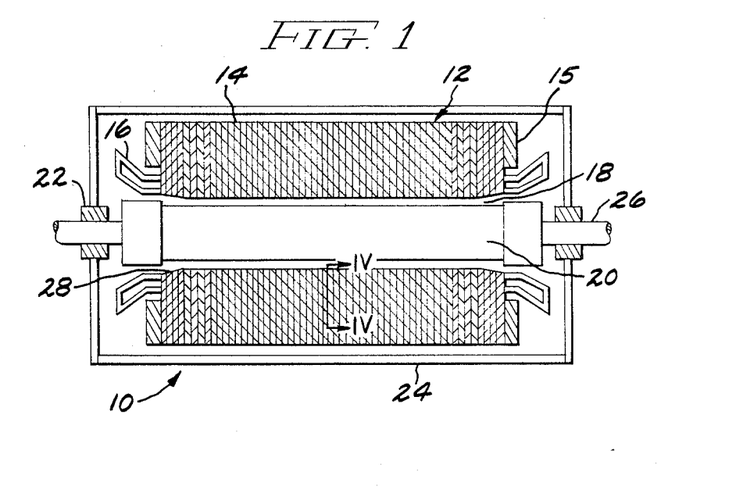
FIG. 1 is a simplified axial cross section of a dynamoelectric generator to which reference will be made in describing the invention.

Referring to FIG. 1, there is shown, generally at 10, a dynamoelectric generator to which the present invention may be applied. Dynamoelectric generator 10 includes a stator 12 which has a stator core 14 built up by stacking a large number of laminations of a magnetic material. The stacked laminations are axially compressed by axial forces applied to the ends thereof through core flanges 15.

A plurality of armature bars (not shown in FIG. 1) are axially disposed in slots (not shown) in the radially inner surface of stator 12. The armature bars are interconnected by end turns 16 extending beyond the axial extremities of stator core 14. Stator 12 forms an annular body having a cylindrical opening 18 on its axis within which a rotor 20 is rotatably mounted using, for example, bearings 22 in a generator frame 24 rotatably supporting shafts 26 of rotor 20.

In order to avoid heating of the ends of stator 12 by stray axial magnetic fields, an outward taper 28 is given to the outer few inches of cylindrical opening 18 at both ends of stator 12.

Figure 2:
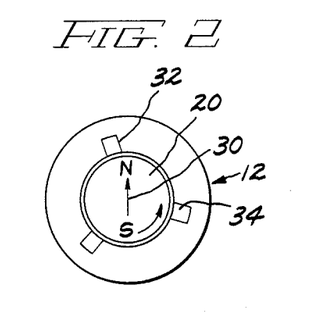
FIG. 2 is an end view of a dynamoelectric generator showing the positioning of "P" bars in the stator thereof.

Referring now to FIG. 2, a simplified transverse cross section of dynamoelectric generator 10 is shown. Rotor 20 is excited by DC excitation applied to it to produce a magnetic field indicated by an arrow 30. A large number of slots are present in the radially inner surface of stator 12, of which only the three stator slots 32 containing "P" bars 34 are shown. As rotor 20 is rotated in the direction shown by a prime mover (not shown), voltages are induced in the "P" bars by the rotation of the magnetic field. The induced voltages are phased 120 electrical degrees apart corresponding to the physical spacing of "P" bars 34. It would be clear to one skilled in the art that the above illustration of rotor 20 with a single pair of magnetic poles does not exhaust the possible options. For example, rotor 20 may alternatively be wound to provide two or more sets of angularly spaced magnetic poles. In such a generator, the one-to-one correspondence between electrical degrees and physical degrees is not maintained. The disclosure herein is unaffected by such difference.

Figure 3:
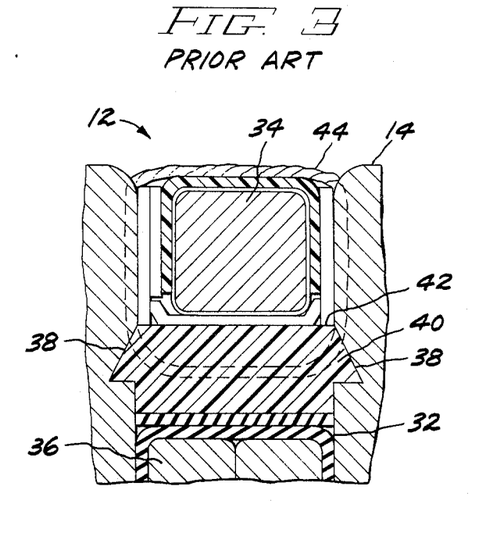
FIG. 3 is a cross sectional view of a stator slot showing the external mounting of a "P" bar according to the prior art.

Before continuing with the disclosure of the present invention, a brief description of the technique for mounting a "P" bar 34 according to the above referenced U.S. Pat. No. 4,385,252 is included for providing additional background to aid in understanding the present invention.

Referring to FIG. 3, stator slot 32 includes a pair of armature bars 36 (only the upper, or radially inner, one of which is shown). The opposed sides of stator slot 32 include dovetail slots 38 which receive a wedge 40 to rigidly secure armature bars 36 in stator slot 32. It will be noted that stator slot 32 extends radially inward a substantial distance beyond a top surface 42 of wedge 40. This space is vacant in all of stator slots 32 except for those containing "P" bars 34. "P" bar 34 is appropriately insulated and blocked in place in stator slot 32, and, as fully explained in the reference patent, is tied in place atop top surface 42 using a plurality of ties 44 which go around the top and sides of "P" bar 34 and under a portion of wedge 40. Ties 44 are preimpregnated with a heat-curable resin which is cured after tying.

Figure 4:
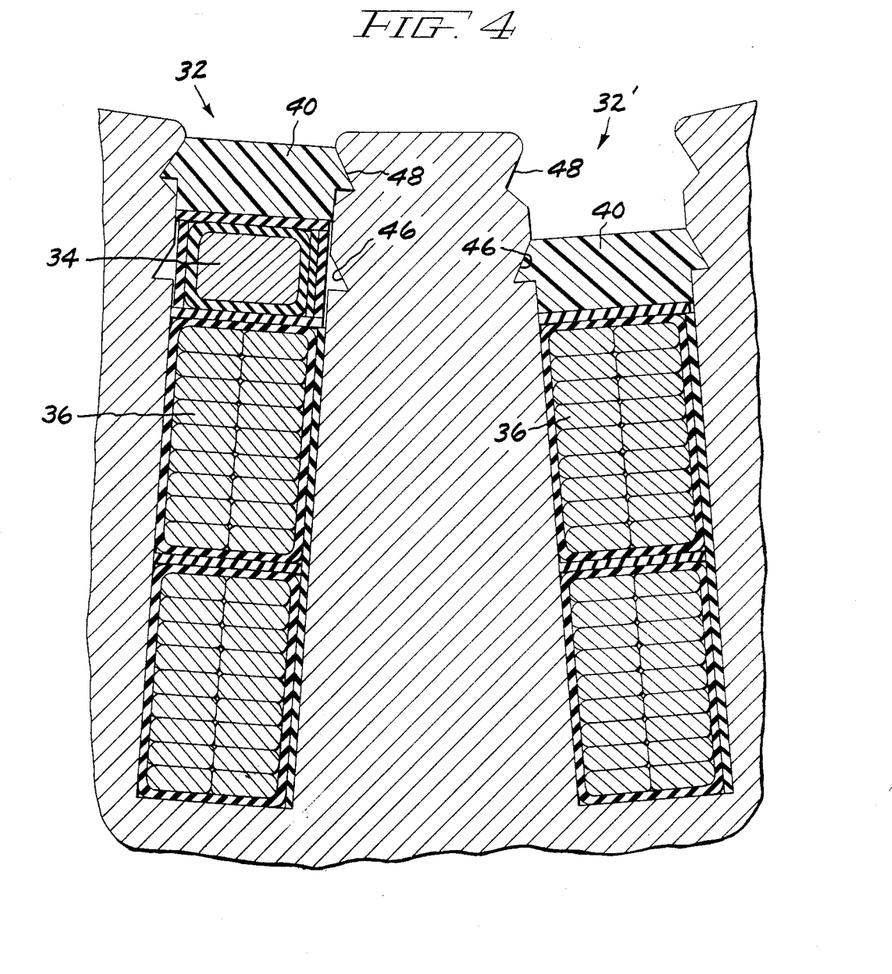
FIG. 4 is a cross section of an adjacent pair of stator slots taken along IV—IV of FIG. 1 showing mounting of an armature bar both with and without the presence of a "P" bar.

Referring now to FIG. 4, there is shown a stator slot 32' according to an embodiment of the invention which does not contain a "P" bar 34. An inner pair of dovetail slots 46 are disposed in the same radial positions as were occupied by dovetail slots 38 (FIG. 3). An outer pair of dovetail slots 48 are disposed radially inward of inner pair of dovetail slots 46. Wedge 40 is shown installed in inner pair of dovetail slots 46 and securing armature bar 36 in place in stator slot 32'. The figure also shows a stator slot 32 containing a "P" bar 34 as well as armature bars 36. "P" bar 34 is disposed atop armature bar 36 beneath wedge 40. In order to provide the necessary additional depth in stator slot 32, wedge 40 is installed in outer pair of dovetail slots 48. This provides secure retention of "P" bar 34 in position without the cost of installing ties and without the need to remove "P" bar 34 if wedge 40 requires replacement.

Figures 5, 6A, 6B, 6C, 6D, 6E:
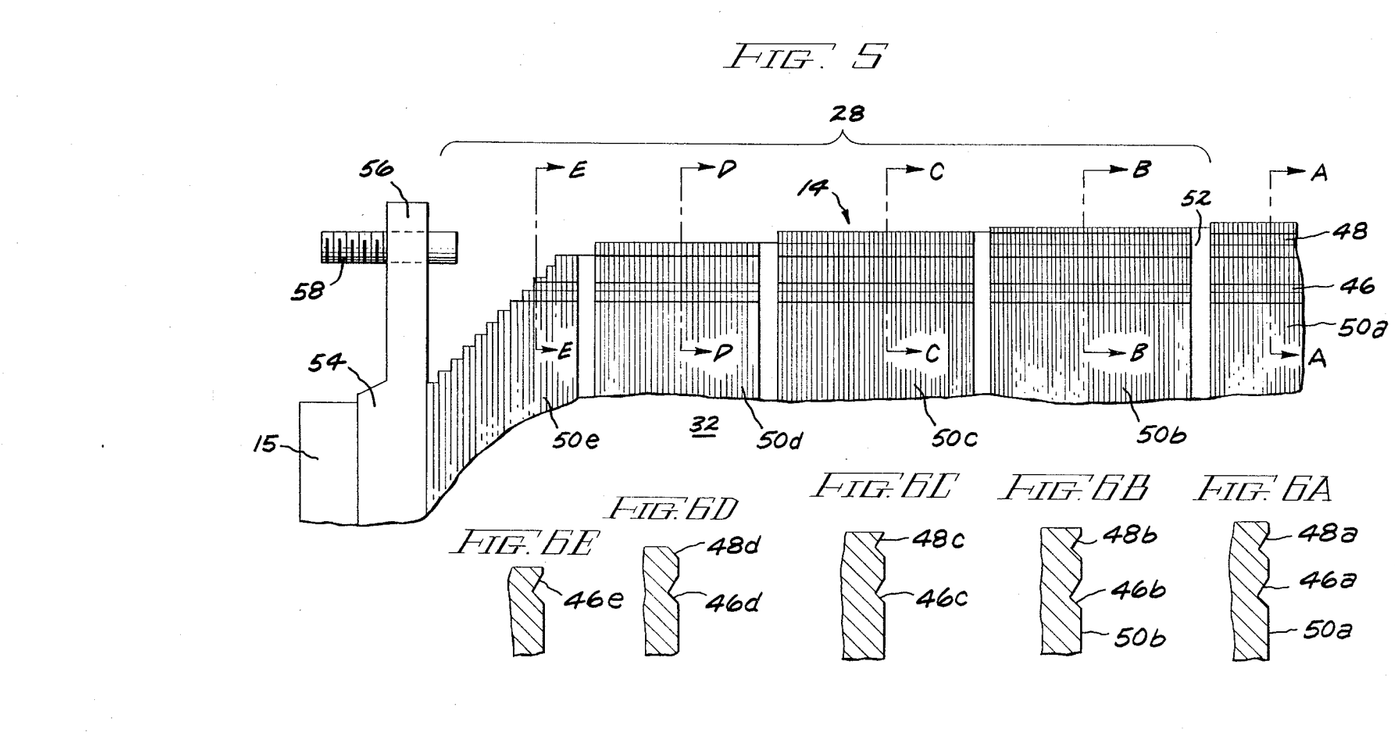
FIG. 5 is a view of an end portion of a stator slot illustrating how the tapered portion at the end of the stator intersects and eliminates the outer pair of dovetail slots.
FIGS. 6A-6E, respectively, are cross sections taken along A—A through E—E, respectively, in FIG. 5.

Referring momentarily to FIG. 1, the embodiment of the invention illustrated in FIG. 4 is satisfactory throughout the axially central portion of stator 12, but a problem develops in the region of outward taper 28. Since outer pair of dovetail slots 48 are closer to the radially inner extremity of stator slot 32 than are inner pair of dovetail slots 46, soon after the beginning of outward taper 28, outward taper 28 cuts through outer pair of dovetail slots 48 and eliminates the support given to wedge 40. This is illustrated in FIG. 5 and the related cross sections shown in FIGS. 6A–6E. As is conventional, stator core 14 is assembled in sets of core packages 50 separated by gas passages 52 for the radial passage of coolant gas therethrough. Gas passages 52 conventionally contain a plurality of I-shaped members maintained in compression between the flanges thereof by the compressive forces applied to the stack of laminations in stator core 14. Outward taper 28 is accomplished over a plurality of core packages 50. For example, core package 50a is a full-depth core package whose cross section A—A, shown in FIG. 6A, exhibits a normal amount of supporting material above outer pair of dovetail slots 48a. The next core package 50b begins outward taper 28 by being stepped down to a slightly shallower depth. As seen in cross section B—B in FIG. 6B, the amount of material above outer pair of dovetail slots 48b is reduced but may still contain enough material to provide substantial support for a wedge 40. The next core package 50c is stepped down even further to the extent that little or no material is left above outer pair of dovetail slots 48c (FIG. 6C) for supporting wedge 40. The next core package 50d is stepped down even further so that no support for wedge 40 is provided. The extreme outer core package 50e is stepped down at its abutment with the adjacent gas passage 52 and continues additional diverging steps until it terminates at a space block 54 clamped against core package 50e by core flanges 15.

Inner pair of dovetail slots 46, being further from the extremity of stator core 14, is relatively unaffected by outward taper 28 in core packages 50a–d. Inner pair of dovetail slots 46e is intersected by outward taper 28 in core package 50e. This intersection occurs close enough to the axially outer extremity of stator core 14 so that external support of end turns (not shown), for an armature bar 36 in a stator slot 32′ not containing a "P" bar 34, may be sufficient to overcome the relatively short unsupported run within stator core 14 beyond the intersection of inner pair of dovetail slots 46c by outward taper 28. As previously noted, however, the ability of outer pair of dovetail slots 48 to support wedge 40 is reduced and then eliminated a substantial distance from the axially outer end of stator core 14.

A space block extension 56 is included on space-apart ones of space blocks 54 for supporting studs 58 which are normally used for attachment of a gas seal (not shown) in dynamoelectric generator 10. Use is made of space block extension 56 and stud 58 in the present invention as will be explained.

Figure 7:
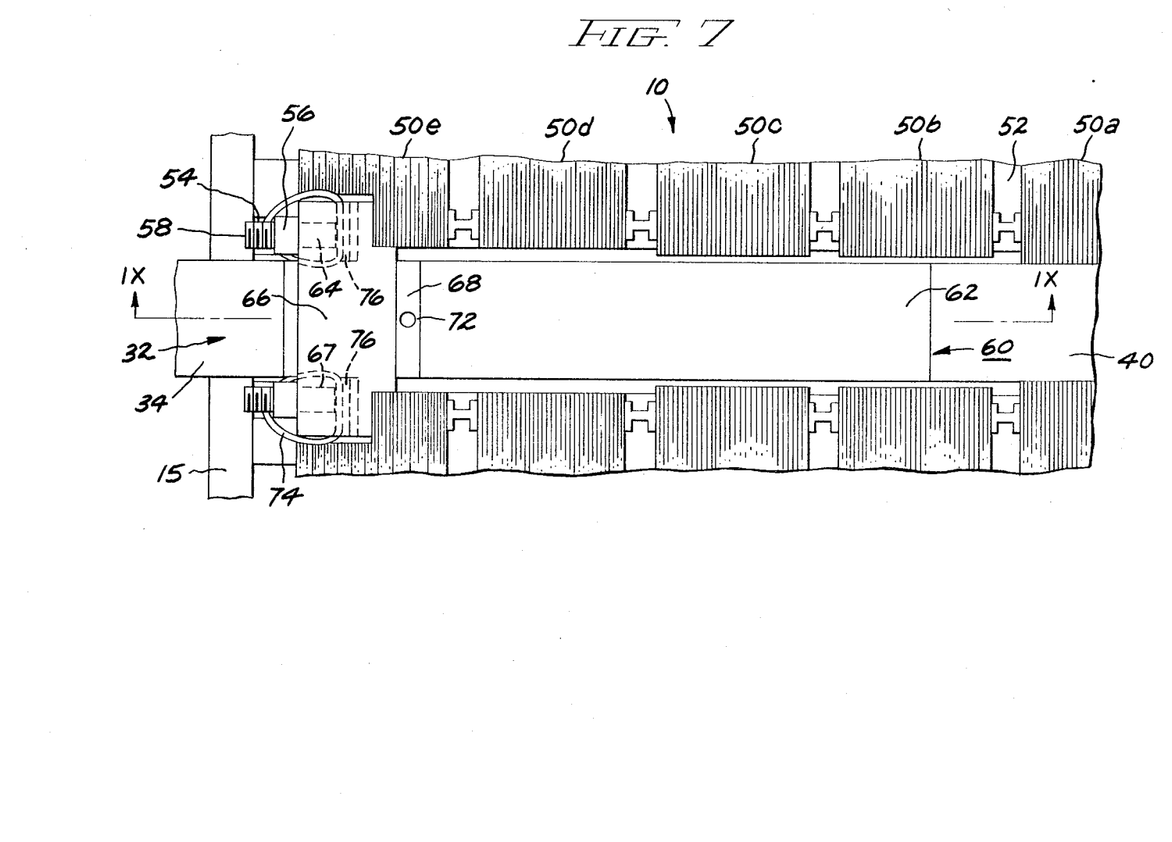
FIG. 7 is a top view of the portion of the stator of FIG. 5 which includes a beam support according to an embodiment of the invention.

Referring now to FIG. 7, a top view of a stator core 14 is shown in which a "P" bar 34 and the underlying armature bars 36 (FIG. 9.) are held in place by a beam support 60 according to an embodiment of the invention. Wedge 40 is terminated at a point in core package 50a, or core package 50b, (a point of core package 50b is illustrated) where adequate supporting material remains in outer pair of dovetail slots 48 (see FIG. 5 and FIG. 6A or 6B). A beam or wedge beam 62, having the same cross-sectional shape as wedge 40, is inserted into outer pair of dovetail slots 48 and into abutment with the end of wedge 40. A space block extension 56 is disposed at each side or stator slot 32 with an inward-extending portion 64 of each stud 58 extending axially inward toward the center of dynamoelectric generator 10. A yoke 66 includes a pair of holes 67 which are fitted onto inward-extending portions 64. Yoke 66 straddles an outer end of wedge beam 62. A trapezoidal locking device 68 is angularly fitted into an angled slot and locked in place by a pin 72. A tie 74 is wrapped about each stud 58 and through a hole 76 in each side of yoke 66 to retain yoke 66 firmly against space block extensions 56 thus securing yoke 66 to an axially outward end of the stator. The axially inner end of wedge beam 62 is held down against "P" bar 34 by engagement with outer pair of dovetail slots 48 in core package 50b. The axially outer end of wedge beam 62 is held down against "P" bar 34 by yoke 66. Thus, "P" bar 34 is fully secured in place under wedge beam 62.

Figure 8:
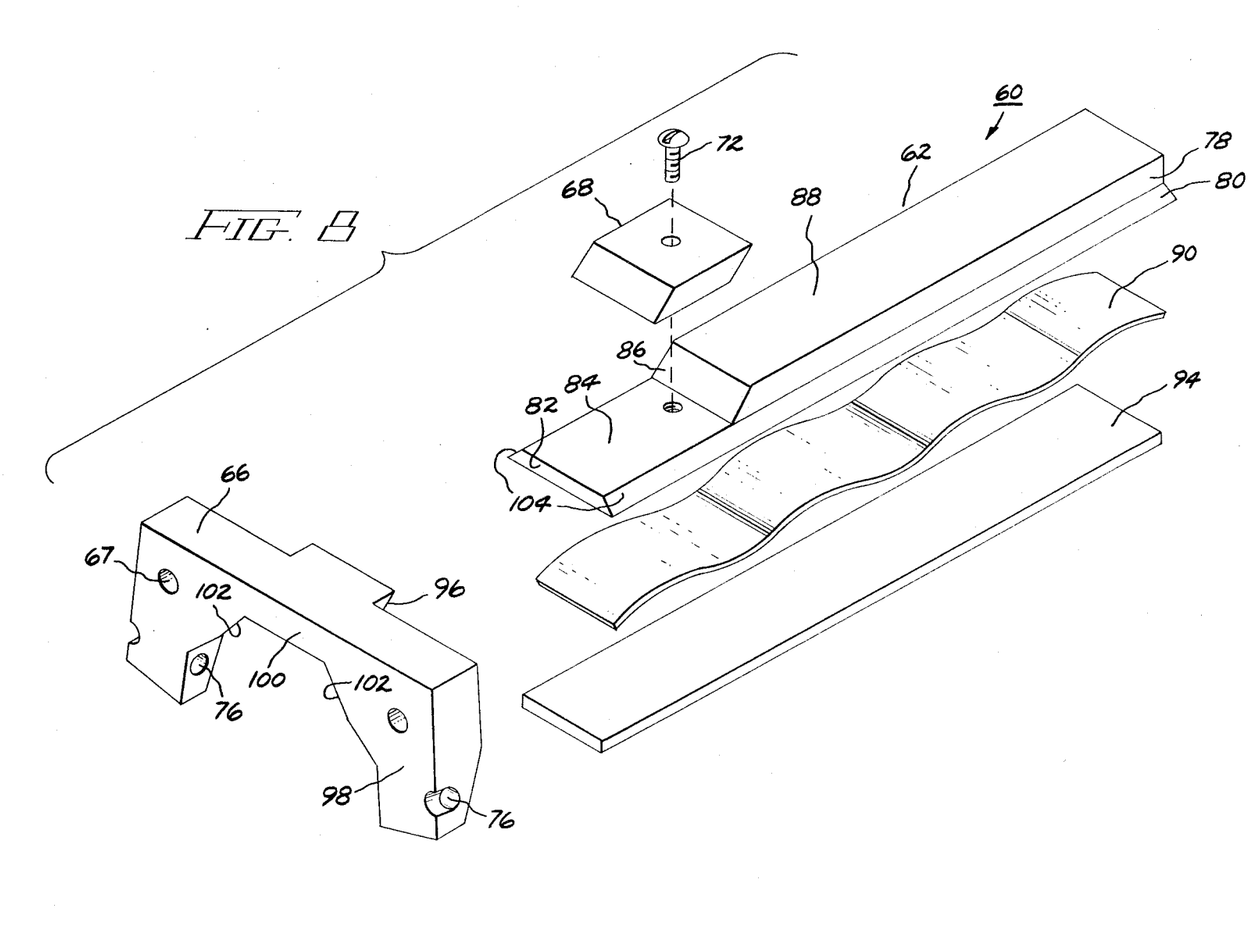
FIG. 8 is an exploded view of the beam support according to an embodiment of the invention.
Figure 9:
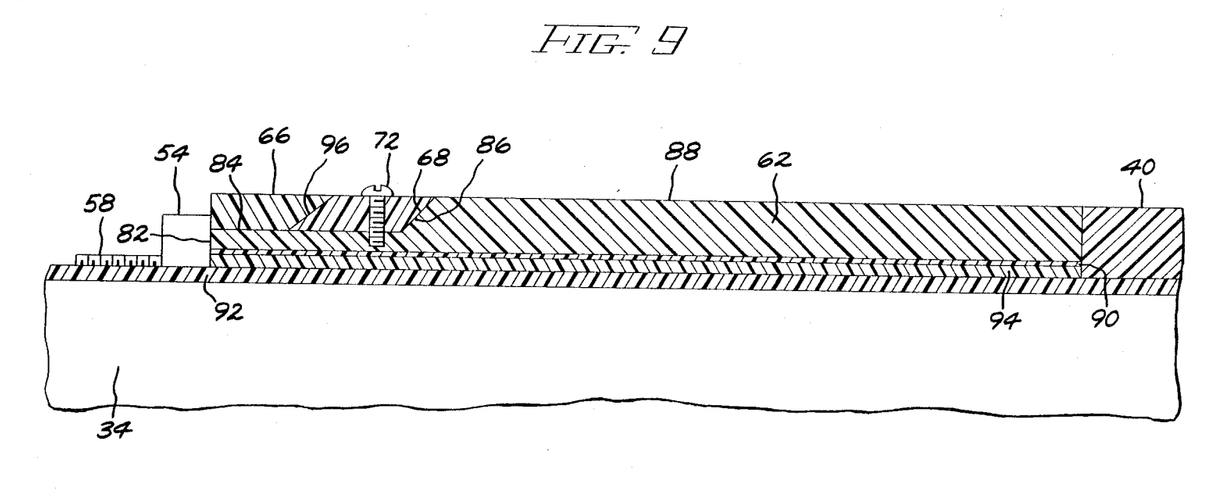
FIG. 9 is a cross section taken along IX—IX of FIG. 7.

Referring now to FIG. 8, in which the elements of beam support 60 are shown in an exploded view for purposes of illustration, and FIG. 9, in which the elements are shown assembled, wedge beam 62 includes an upper portion 78 of generally rectangular cross section and a lower portion 80 which includes the angled flanges for engaging outer pair of dovetail slots 48 at the axially inner end of wedge beam 62. A tonue 82 having a flat upper surface 84 extends axially from wedge beam 62. An angled face 86 joins an upper surface 88 of upper portion 78 to flat upper surface 84. A ripple spring 90 is disposed below wedge beam 62 for providing a substantial radial force tending to secure "P" bar 34 in position. Ripple spring 90 is shown in its relaxed condition in FIG. 8. When installed, ripple spring 90 is preferably completely flattened between wedge beam 62 and "P" bar 34 as shown in FIG. 9.

In order to prevent a high-voltage insulation layer 92 on "P" bar 34 from being damaged by contact with ripple spring 90, a hard, non-abrasive filler strip 94 is positioned between ripple spring 90 and "P" bar 34.

As particularly shown in FIG. 9, an angled face 96 on yoke 66 lies parallel to angled face 86 on wedge beam 62. Trapezoidal locking device 68 is thus enabled to slide between angled face 96 and angled face 86 and, when pinned in place by pin 72, prevents removal of trapezoidal locking device 68.

When stator core 14 is assembled, studs 58 are normally welded or otherwise permanently installed in space blocks 54 before beam support 60 is mounted. During installation of beam support 60, wedge beam 62, with ripple spring 90 and non-abrasive filler strip 94 below it, is inserted into outer pair of dovetail slots 48 (FIG. 5). In order to clear the inner ends of inward-extending portions 64 of studs 58 (FIG. 7), yoke 66 must be positioned to occupy the space later taken by trapezoidal locking device 68 and then holes 67 are slid onto inward-extending portions 64. Inward-extending portions 64 preferably contain an uncured resin during assembly which is later cured to firmly affix yoke 66 in place against space block 54. After yoke 66 is slid onto inward-extending portions 64, the trapezoidal space left vacant by this assembly technique is filled by trapezoidal locking device 68 which thereupon provides axial support for helping to maintain yoke 66 and wedge beam 62 in their final positions.

Figure 10:
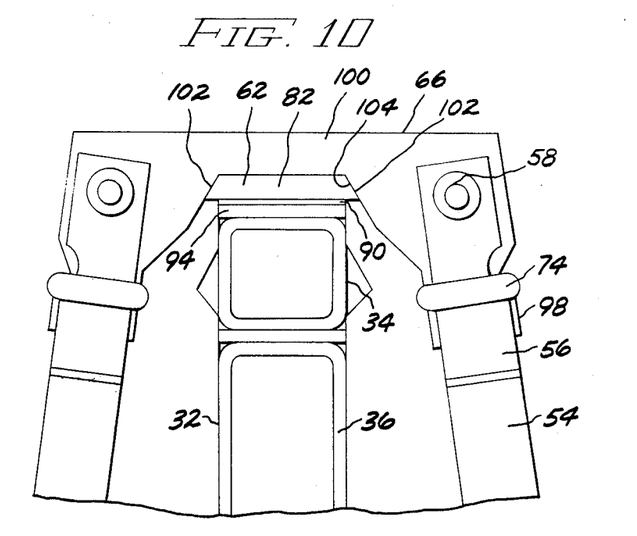
FIG. 10 is an end view of the beam support of FIGS. 7-9.

Referring now to FIGS. 8 and 10, yoke 66 includes a pair of legs 98 joined by a bridge 100 spanning tongue 82. Legs 98 include angled surfaces 102 whose angles generally coincide with the angles of edges 104 of flat upper surface 84. Thus, when tongue 82 is held down by bridge 100, angled surfaces 102 and edges 104 tend to maintain the axially outer end of wedge beam 72 properly centered over stator slot 32.

Beam support 60 is preferably made of a non-magnetic material and most preferably of a non-metallic material. With the exception of studs 58 which are stainless steel, all parts of beam support 60 are preferably made of a hard, high-strength matrix of resin and fabric. Wedge beam 62 and yoke 66 are preferably of glass fiber in a cured epoxy resin. Ripple spring 90 is also preferably a glass fiber and epoxy resin chosen from types which retain their resilient properties over time. Ripple spring 90 may alternatively be replaced by corresponding means for applying radial force to "P" bar 34 such as, for example, a body of elastomeric material or a spring having a lunate cross section. Filler strip 94 is chosen for its ability to prevent damage to the high-voltage insulation on the surface of "P" bar 34. For this purpose, an organic fiber-resin system may be employed, such as conveniently a cotton-phenolic laminate.

The orientation of the fabric in wedge beam 62 is preferably parallel to the axis of wedge beam 62 for best resistance to bending forces. The orientation of the fabric in yoke 66 is preferably normal to the axis of wedge beam 62. In a further embodiment of the invention, wedge beam 62 and yoke 66, instead of being two separate pieces, may be cast, or otherwise formed, in a single unitary assembly. In a cast version of the invention, a chopped fiber is preferably used in order to develop adequate strength in both the axial and the normal directions.

Having described preferred embodiments of the invention with reference to the accompanying drawings, it is to be understood that the invention is not limited to those precise embodiments, and that various changes and modifications may be affected therein by one skilled in the art without departing from the scope or spirit of the invention as defined in the appended claims.

What is claimed is:

1. Apparatus for securing a "P" bar in a stator slot of a generator stator atop at least one armature bar disposed in said slot, said stator slot including at least one pair of dovetail slots radially disposed to permit fitting said at least one armature bar and said "P" bar under a wedge fitted into said dovetail slots, said stator including a taper at an outer end thereof, said taper intersecting said at least one pair of dovetail slots, comprising:
   a beam;
   said beam including angled edges at a first axial end thereof fittable into a portion of respective ones of said at least one pair of dovetail slots when the wedge is fitted into an other portion of said at least pair of dovetail slots;
   a yoke for stradling a second axial end of said beam when said beam is fitted into said at least one pair of dovetail slots; and
   means for securing said yoke to an axially outward end of said stator.

2. Apparatus as in claim 1, further comprising resilient means disposed between said beam and said "P" bar for applying a radial force to said "P" bar.

3. Apparatus according to claim 2, wherein said beam, said yoke and said resilient means are of non-metallic material.

4. Apparatus according to claim 3 wherein said non-metallic material is a fiber in a cured resin.

5. Apparatus according to claim 4 wherein said fiber includes a glass fiber.

6. Apparatus according to claim 5 wherein said fiber in said beam is oriented parallel to an axis of said beam and said fiber in said yoke is oriented perpendicular to said axis of said beam.

7. Apparatus according to claim 2 wherein said resilient means includes a ripple spring.

8. Apparatus according to claim 7 wherein said ripple spring is of non-magnetic material.

9. Apparatus according to claim 2 wherein said resilient means includes a ripple spring and a non-abrasive filler strip disposed between said ripple spring and said "P" bar, whereby damage to said "P" bar from contact with said ripple spring is avoided.

10. Apparatus for securing a "P" bar in a stator slot of a generator stator atop at least one armature bar disposed in said slot, said stator slot including at least one pair of dovetail slots radially disposed to permit fitting said at least one armature bar and said "P" bar under a wedge fitted into said dovetail slots, said stator including a taper at an outer end thereof, said taper intersecting said at least one pair of dovetail slots, comprising:
   a beam;
   said beam including angled edges at a first axially inward end thereof fittable into said dovetail slot and further wherein said beam includes a tongue at a second axially outward end;
   a yoke effective for stradling said second axially outward end of said beam wherein said yoke includes first and second legs joined by a bridge, said bridge being fittable over said tongue;
   means for securing said yoke to an axially outward end of said stator; and
   resilient means operationally disposed between said beam and said "P" bar for applying a substantially radial force to said "P" bar.

11. Apparatus according to claim 10 wherein said tongue includes second angled edges and said legs include angled surfaces effective to engage said second angled edges and to urge said tongue into a centered position in said stator slot.

12. Apparatus according to claim 10 wherein said beam includes a first angled surface adjacent said tongue, said bridge includes a second angled surface parallel to said first angled surface, said first and second angled surfaces being separated by an axial separation when said beam and said yoke are installed in their operational positions.

13. Apparatus according to claim 12, further comprising a locking piece inserted between said first and second angled surfaces and effective for maintaining said beam and said yoke in their axial locations.

14. Apparatus according to claim 13 wherein said locking piece includes a pin passing through said locking piece and into at least one of said beam and said yoke.

15. Apparatus according to claim 10 wherein said means for securing said yoke includes first and second space blocks adjacent said stator slot, said first and second space blocks including first and second space block extensions respectively thereon, first and second studs in said first and second space block extensions respectively, said first and second space block extensions including an inward-extending portion extending axially inward a predetermined distance, said yoke including first and second holes therein fittable upon said first and second inward-extending portions and means for tying said first and second legs to said first and second space block extensions.

16. A generator stator comprising:
   a plurality of stator slots;
   at least one armature bar in one of said stator slots;
   a "P" bar disposed atop said at least one armature bar in said one of said stator slots;

first and second opposed dovetail slots in said one of said stator slots;

a wedge fitted into a portion of said first and second opposed dovetail slots, said wedge for applying a first radial force to said "P" bar;

a taper at an outer end of said stator, said taper intersecting said first and second dovetail slots and at least reducing an ability of said wedge to apply said first radial force to said "P" bar;

a beam;

said beam including angled edges at a first an axially inward disposed first end thereof fitted into another portion of said first and second dovetail slots at an axial position in said stator where a substantial portion of said first and second dovetail slots remain;

a yoke stradling an axially outward disposed second end of said beam for supporting the axially outward second end of said beam; and means for securing said yoke to an axially outward end of said stator.

17. The stator as in claim 16, further comprising resilient means disposed between said beam and said "P" bar for applying a second radial force to said "P" bar.

* * * * *